Oct. 15, 1940.   G. W. NEWMAN   2,218,213
PRUNING DEVICE
Filed Dec. 21, 1938
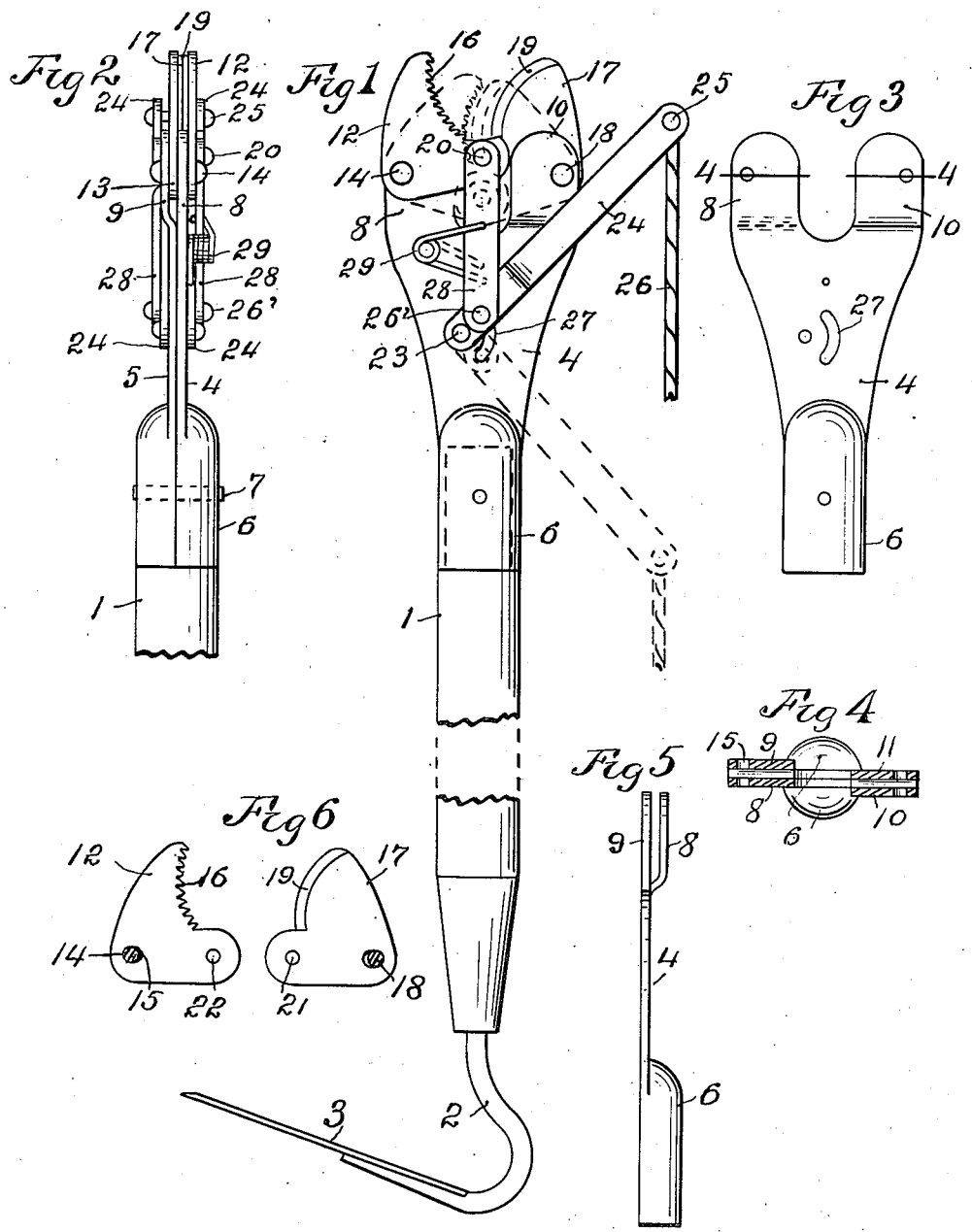
Inventor
George W. Newman
By Warren D. House
His Attorney Patented Oct. 15, 1940

2,218,213

UNITED STATES PATENT OFFICE 2,218,213

PRUNING DEVICE

George W. Newman, Kansas City, Mo.

Application December 21, 1938, Serial No. 247,041

2 Claims. (Cl. 30—245)

My invention relates to improvements in pruning devices.

One of the objects of my invention is the provision of a novel pruning device of the kind described, which is simple, cheap, strong, durable, not likely to get out of order, which has great power and is adapted to easily sever thick branches, to be easily inserted into the ground for severing roots, and which is efficient in its operation.

Another object of my invention is the provision of a novel combination pruning device and hoe mounted on one handle, and adapted for alternate use in the treatment of ground.

The novel features of my invention are hereinafter fully described and claimed.

In the accompanying drawing which illustrates a preferred embodiment of my invention, Fig. 1 is a side elevation, partly broken away, showing my improved combined hoe and pruning device.

Fig. 2 is an edge elevation of the pruning device partly broken away.

Fig. 3 is a side view of the support for the moving parts of the pruner.

Fig. 4 is a section on 4—4 of Fig. 3.

Fig. 5 is an edge elevation of one of the two members which are fastened integrally together and form the support for the moving parts of the pruning device.

Fig. 6 is a side view of one of the toothed gripping jaws and of the cutting jaw disconnected from each other.

Similar characters of reference designate similar parts in the different views.

1 designates a usual hoe handle to one end of which is attached by a shank 2 a hoe blade 3 of common type.

To the other end of the handle 1 is attached the pruning device comprising the following described parts:

A support for the moving parts consist of two plates 4 and 5, substantially similar in form and structure, each comprising flat body portions rigidly fastened together, as by welding or riveting, and each having at its inner end a hollow semicylindrical portion 6, which with the similar portion of the other plate, forms a cylinder in which is inserted, and fastened by a transverse pin 7, the adjacent end of the handle 1.

The support, composed of the two plates 4 and 5, integral with each other, has at its outer end at one side edge a pair of parallel arms 8 and 9, and, spaced therefrom, at its opposite edge, the support has another pair of parallel arms 10 and 11.

Two gripping jaws 12 and 13, disposed respectively at opposite sides of the arm 8, are pivoted thereto and to the arm 9 on the same axis comprising a transverse pin 14, which extends through and is loosely fitted in two registering holes 15, provided one in each jaw 12 and 13. The two jaws are duplicates, and each has on its inner edge a concavely arcuate toothed portion 16, Figs. 1 and 6, which is adapted to grip one side of a branch, twig or other object to be severed.

A cutting jaw 17, Figs. 1 and 6, is pivoted on another axis, comprising a pin 18 parallel with the pin 14, to and between the support arms 10 and 11. The inner edge of the jaw 17 has a convexly arcuate cutting edge 19 intermediate of the jaws 12 and 13, for engaging and severing the object to be severed, at the side opposite that which is gripped by the jaws 12 and 13.

The jaws 12 and 13 are pivoted to the jaw 17, between the axes pins 14 and 18 by a pin 20 which extended through a hole 21 in the jaw 17 and through two holes 22 provided respectively in the jaws 12 and 13 and in register with the hole 21. This arrangement forms of the jaws 12 and 13 and the jaw 17 a toggle, which, when the connecting pin 20 nears or passes the toggle center, a line connecting the pins 14 and 18, causing the gripping and cutting jaws to grip with great force the object between them, thus enabling the cutting jaw 17 to easily sever branches of as great diameter as can be disposed between the cutting jaw and the gripping jaw. By having the jaw 17 intermediate of the jaws 12 and 13, the jaw 17 is held from being forced laterally when heavy material is being cut.

For swinging the jaws 12 and 13 and jaw 17 to the severing position, shown in dotted lines in Fig. 1, there is pivoted by a pin 23, which extends transversely through the support 4—5, two levers 24, disposed respectively at opposite sides of the support.

The levers 24 adjacent to their outer ends have mounted in them a transverse pin 25 to which is attached one end of a rope or cable 26. A transverse pin 26 extends through an arcuate slot 27, Figs. 1 and 3, concentric with the pin 23 that extends through the support 4—5. The ends of the pin 26 extend through the levers 24 and through the inner end portions of two longitudinal central links 28, at the outer sides respectively of the levers 24.

The end portions of the connecting toggle pin 20 extends through the outer end portions of the links 28, thereby connecting the jaws 12 and 13 and 17 with the levers 24. When the levers 24 are swung toward the hoe shank 2, by the rope or cable 26, the links 28 will swing the jaws 12, 13 and 17 to the severing position, shown in dotted lines in Fig. 1, thus causing the cutting edge 19 of the jaw 17 to sever any branch, twig, stalk, or root that may have been placed between the jaw 17 and the jaws 12 and 13.

For swinging the jaws 12, 13 and 17 back to their open position, shown in solid lines in Fig. 1, a coil spring 29 has one end fastened to one of the links 28, and its other end fastened to the support 4—5. The tension of the spring 29 is such as to normally force the link 28, to which it is attached, to move outwardly, and thereby, through the connecting toggle pin 20, swinging the jaws to the open position, and the levers 24 to the initial position, shown in solid lines in Fig. 1.

When it is desired to sever a root in the ground, one hand of the operator grips the hoe shank 2, and forces the jaws 12, 13 and 17 into the ground, in the open position, and so as to place the root between the jaw 17 and the jaws 12 and 13. He then pulls the rope or cable 26 toward the hoe shank 2, thereby swinging the levers 24 so as to close the jaws upon the root, thereby severing the root. On releasing the pull on the cable or rope 26, the spring 29 will swing the jaws to the initial open position.

The hoe shank 2 is also employed as a hand hold when the pruning device is used for pruning limbs or twigs from trees or bushes. The hoe shank, thus performs the double function of a support for the hoe blade, and as a handhold for the operator in trimming or severing with the pruning device.

By mounting the pruner at one end of the hoe handle, a very convenient implement is provided for working the ground with the hoe, and for severing roots, which interfere with the operation of the hoe blade.

By providing the jaws 12 and 13 with the concavely arcuate toothed edge portions 16, the branch or object that is being severed by the cutting jaw 17, is firmly held from slipping out when subjected to the very strong pressure applied by the jaws 12 and 13 and the jaw 17, due to the toggle construction.

Many modifications of my invention, within the scope of the appended claims, may be made without departing from the spirit of my invention.

I claim:

1. In a pruning device, in combination, a support having two pairs of arms, a pair of jaws at opposite sides of one arm of one of said pairs and pivoted on the same axis to the arms of said one pair of arms for gripping one side of an object to be severed, a jaw pivoted on another axis to and between the arms of the other pair and having a cutting edge intermediate of the jaws of said pair for engaging the opposite side of the object, and means pivotally connecting the jaws of said pair with said cutting jaw.

2. In a pruning device, in combination, a support having two pairs of arms, a pair of jaws at opposite sides of one arm of one of said pairs and pivoted on the same axis to the arms of said one pair of arms for gripping one side of an object to be severed, a jaw pivoted on another axis to and between the arms of the other pair and having a convexly arcuate cutting edge intermediate of the other two jaws for engaging the opposite side of the object, and means pivotally connecting the jaws of said pair with said cutting jaw.

GEORGE W. NEWMAN.